US 6,724,334 B2

(12) United States Patent
Tzelnick (10) Patent No.: US 6,724,334 B2
(45) Date of Patent: Apr. 20, 2004

(54) DIGITAL TO ANALOG CONVERTER ARRAY (75) Inventor: Tzvi Tzelnick, Tel-Aviv (IL)

(73) Assignee: Lenslet Ltd., Herzelia Pituach (IL)

( * ) Notice: Subject to any disclaimer, the term of this patent is extended or adjusted under 35 U.S.C. 154(b) by 0 days.

(21) Appl. No.: 10/234,632

(22) Filed: Sep. 3, 2002

(65) Prior Publication Data

US 2003/0043133 A1 Mar. 6, 2003

(30) Foreign Application Priority Data

Sep. 3, 2001 (IL) .................................................. 145245

(51) Int. Cl.[7] .............................................. H03M 1/66
(52) U.S. Cl. .......................................... 341/144; 345/98
(58) Field of Search ................................. 341/144, 143

(56) References Cited

U.S. PATENT DOCUMENTS

| 4,872,002 | A | * | 10/1989 | Stewart et al. ............... 340/811 |
| 5,532,763 | A | | 7/1996 | Janssen et al. |
| 5,670,979 | A | | 9/1997 | Huq et al. |
| 6,320,565 | B1 | * | 11/2001 | Albu et al. .................... 345/98 |

FOREIGN PATENT DOCUMENTS

| WO | WO 96/00479 | 1/1996 |
| WO | WO 00/72104 | 11/2000 |
| WO | WO 00/72105 | 11/2000 |
| WO | WO 00/72106 | 11/2000 |
| WO | WO 00/72107 | 11/2000 |
| WO | WO 00/72108 | 11/2000 |
| WO | WO 00/72267 | 11/2000 |
| WO | WO 00/76102 | 12/2000 |
| WO | WO 01/77773 | 10/2001 |
| WO | WO 01/78011 | 10/2001 |
| WO | WO 01/78012 | 10/2001 |
| WO | WO 01/78261 | 10/2001 |
| WO | WO 01/84262 | 11/2001 |
| WO | WO 02/17329 | 2/2002 |

OTHER PUBLICATIONS

Kleinfelder,et al.; "A 10kframe/s 0.18mm CMOS Digital Pixel Sensor with Pixel–Level Memory;" Feb. 5–7, 2001; 2001 IEEE International Solid–State Circuits Conference; Session 6.1; CMOS Image Sensors with Embedded Processors; pp. 88, 89 and 435.

Genov, R. et al.; "Charge–Mode Parallel Architecture for Vector–Matrix Multiplication;" Oct. 2001; IEEE Transactions on Circuits and Systems–II: Analog and Digital Signal Processing; vol. 48, No. 10; pp. 1–7.

Kub, F. et al.; "Programmable Analog Vector–Matrix Multipliers;" 1990; IEEE Journal of Solid–State Circuits; vol. 25, No. 1, pp. 207–214.

* cited by examiner

Primary Examiner—Peguy JeanPierre
Assistant Examiner—Joseph J Lauture
(74) Attorney, Agent, or Firm—Fenster & Company (57) ABSTRACT A digital to analog converter array including a plurality of pixels arranged in an array and independently addressable to selectively modulate light; a digital counter which generates a sequence of numbers in digital form; an analog signal source which generates an analog signal that corresponds the sequence generated by the digital counter; and a plurality of array elements which control the pixels, each element including a digital memory register holding at least one input number; a comparator which generates an enabling signal responsive to a comparison between the number in the sequence and the input number; and a sample and hold circuit which samples the value of the analog signal, responsive to said enabling signal, and sets an output voltage controlling a pixel to said value, wherein the array is configured so that the comparators in all the array elements compare the number in the sequence to the input numbers held in said array elements substantially simultaneously.

35 Claims, 5 Drawing Sheets

DIGITAL TO ANALOG CONVERTER ARRAY

FIELD OF THE INVENTION

The present invention is related to the field of digital to analog converters, in one embodiment, for optical computing.

BACKGROUND OF THE INVENTION

Optical computing offers advantages over electronic computing for many applications. PCT publications WO 00/72104 and WO 00/72107 describe an optical analog computer which calculates general linear transforms using massively parallel processing. Applications include image compression, image enhancement, pattern recognition, signal identification, signal compression, optical interconnects and crossbar systems, morphologic operations, logical operations, image and signal transformation and modeling neural networks. While it may sometimes be possible, for example in image compression, to use input data that is initially in analog optical form, for many applications the input data is initially stored electronically in digital form, and must be converted into analog optical form before feeding it into the optical computer. To take advantage of the high computation speed of a massively parallel optical computer, there is a need for a system which rapidly converts a large amount of digital data into analog form.

Digital to analog converters (DAC) and analog to digital converters (ADC) are well known. An array of values can be converted from digital to analog form, or from analog to digital form, either in series, feeding each value into a single converter, or in parallel, simultaneously feeding all the values in the array into separate converters. For a very large array, serial conversion can be very slow, and parallel conversion can be very expensive since it requires a large number of converters.

Kleinfelder et al., "A 10 kframe/s 0.18 $\mu$m CMOS Digital Pixel Sensor with Pixel-Level Memory," 2001 IEEE International Solid-State Circuits Conference, Feb. 5–7, 2001, Session 6.1, CMOS Image Sensors with Embedded Processors, pages 68, 69 and 435, describe a system for parallel analog to digital conversion for a large array of pixels, in which the circuitry needed for each pixel is simpler and less expensive than a complete stand-alone analog to digital converter. A digital ramp signal, consisting of a sequence of 8-bit numbers in numerical order, is generated centrally, together with an analog ramp signal equivalent to the digital ramp signal, i.e. a triangle wave. Both signals are fed to all the pixels. Each pixel has a comparator circuit which compares the analog ramp signal to the value of the analog input for that pixel. When the ramp signal first exceeds the value of the analog input, the comparator circuit activates a digital latching circuit, which latches the current value of the digital ramp signal into the digital memory of that pixel. This digital memory serves as the digital output for the analog to digital conversion.

Albu et al., U.S. Pat. No. 6,320,565, describes a system for digital to analog conversion of a large array of pixels for driving an electro-optic display device, in which all the pixels in one row of the array are converted in parallel, followed by the next row, and continuing until the entire array is converted, then beginning a new frame. A global ramp generator generates an analog ramp signal going from zero to a maximum voltage, which is applied to capacitors associated with all the pixels in the row being processed at that time. An analog to digital converter produces a corresponding global digital ramp signal. For each column in the array, there is a digital comparator which compares the digital ramp signal to an incoming digital video signal for the pixel at the intersection of that column and the row being processed. When the digital ramp signal matches the digital input signal for that column, a sample and hold circuit opens, and isolates the analog ramp signal from the capacitor associated with that pixel, and the voltage on that pixel then remains fixed, decaying slowly until the next frame is processed. In the next ramp cycle, the analog ramp signal is applied to the capacitors associated with the pixels in the next row, and so on. Several ramp cycles before a given row is processed, the analog ramp signal is temporarily reconnected to the capacitors of that row at a time when the analog ramp is close to zero, resetting those pixels to zero. This prevents image artifacts that would occur due to the residual state of the electro-optic material from previous frames.

SUMMARY OF THE INVENTION

An aspect of some embodiments of the invention concerns an array of circuitry for digital to analog conversion in parallel, in which signals for all the pixels of a two-dimensional array of pixels are converted simultaneously, rather than processing only one row of pixels at a time, as in Albu et al. Although this may require more complicated circuitry than Albu et al., for example possibly including a separate digital comparator for each pixel rather only one per column, it is possible to display a frame much more quickly than in the system disclosed by Albu et al. and the circuitry is still simpler and less expensive than a prior art array of circuitry with a stand alone digital to analog converter for each pixel. For the video display application of Albu et al., there would be no advantage to converting all of the pixels of a frame into analog form in parallel, since it is never necessary to display more than a few tens of frame per second, and converting all of the pixels in a frame in parallel would require more expensive hardware than only converting all of the pixels in a row in parallel Even if only one row in the image is updated at a time, at tens of frames per second, it will appear to the human eye as if the entire image is changing continuously. For optical computing, however, it may be useful to convert thousands of frames per second from digital to analog form, for example to avoid having the processor remain idle for a large fraction of the time while the pixels are updated. Thus, for optical computing the cost of the additional hardware may be justified.

The circuitry in accordance with some embodiments of the invention accomplishes the reverse of the task accomplished by the analog to digital conversion array described by Kleinfelder et al. In an exemplary embodiment of the invention, there arc a digital ramp signal and an equivalent analog ramp signal, which are optionally generated centrally, and are accessible to some or all of the elements of the array. In some embodiments of the invention, each element of the array comprises a digital comparator, which compares the digital ramp signal to the input value held in a digital memory associated with that element. When the two values are equal, the comparator generates an enabling signal which activates a sampling and holding circuit associated with that element. The sampling and holding circuit samples the value of the analog ramp signal at that time, and sets the value of an analog output for that element to the value of the analog ramp signal. The analog output is held at this value until the next time the comparator sends the enabling signal to the sampling and holding circuit. The sampling and holding circuit can be quite simple, optionally comprising only a transistor and a capacitor.

Optionally, the output of each pixel in the DAC array is connected directly to the corresponding input pixel of the optical computer, rather than transferring the optical signals along optical fibers. Optionally, the input pixels of the optical computer comprise a multi-quantum well structures made of alternating layers of gallium arsenide (GaAs) and gallium aluminum arsenide (GaAlAs), and the input pixels of the optical computer are bonded to the output pixels of the DAC array using the Flip Chip Bonding technique. Optionally, the DAC array is a monolithic silicon integrated circuit, whose elements are arranged with the same spacing as the input pixels of the optical computer. Unlike in a conventional TV display, the updating of the input pixels need not be done at regular intervals, but optionally is done only when the optical computer requires the next set of input data. Optionally, only some of the elements are updated, when only partial updating is required. Optionally, some or all of the elements include a calibration circuit, for example a capacitor, to allow adjustment in the analog response of the element, for example to correct for physical defects and/or variability. Other types of technologies, for example semiconductor technologies may be used instead of MQW technology.

An aspect of some embodiments of the invention concerns an array of circuitry for digital to analog conversion in parallel, in which there are two or more digital memory registers associated with each pixel, and a central controller (or, in some embodiments an element controller) can choose which set of digital memory registers to convert to analog voltages and load into the pixels. For example, while the first memory register in each pixel is being converted to analog form, new digital values could be loaded into the second memory register in each pixel. Or, several memory registers can be loaded into the pixels in rapid succession, one frame after the other, to do an optical computation, in less time than it takes to load that many frames into the digital memory registers. The values may be repeatedly cycled, as needed for specific computations, for example the coefficients of Digital Fourier Transform (DFT), a matrix and its transpose, real and imaginary parts. Alternatively, mathematical processing can be done electronically (in parallel) on the different memory registers, for example, for pre-processing of the input data to an optical computer, or for image enhancement if the array is used to drive a video display panel. For example, two or more frames could be averaged to reduce noise, or the difference between two frames could be taken to detect motion or other changes, or pixels from one frame could be substituted for pixels from another frame when the latter have a certain range of values. Optionally, the circuitry includes the ability to shift analog values in a row and/or a column in one or both directions.

Alternatively or additionally, to a digital memory, an element may include one or more analog memories that can be switched and used to drive the array and optionally loaded using said digital memory.

There is thus provided in accordance with an exemplary embodiment of the invention, a digital to analog converter array comprising:

a plurality of pixels arranged in an array and independently addressable to selectively modulate light;

a digital counter which generates a sequence of numbers in digital form;

an analog signal source which generates an analog signal that corresponds the sequence generated by the digital counter; and a plurality of array elements which control the pixels, each element comprising:

a digital memory register holding at least one input number;

a comparator which generates an enabling signal responsive to a comparison between the number in the sequence and the input number; and a sample and hold circuit which samples the value of the analog signal, responsive to said enabling signal, and sets an output voltage controlling a pixel to said value, wherein the array is configured so that the comparators in all the array elements compare the number in the sequence to the input numbers held in said array elements substantially simultaneously.

Optionally, for at least one array element the output voltage controls the amount of light transmitted through the pixel controlled by said array element. Alternatively or additionally, for at least one array element the output voltage controls the amount of light reflected by the pixel controlled by said array element. Optionally, the pixel comprises a polarization rotating material controlled by the output voltage, and a polarizing filter. Alternatively or additionally, the pixel comprises a Multi Quantum Well structure, the reflectance of which controlled by the output voltage.

In an exemplary embodiment of the invention, for at least one array element the output voltage controls the amount of light emitted by the pixel controlled by said array element.

In an exemplary embodiment of the invention, said analog signal source comprises digital to analog converter which generates the analog signal by converting the sequence of numbers to said analog signal.

In an exemplary embodiment of the invention, said analog signal source comprises an analog circuit, which generates said analog signal. Optionally, the digital counter comprises an analog to digital converter which generates the sequence of numbers by converting the analog signal to said sequence of numbers.

In an exemplary embodiment of the invention, the sequence of numbers is in increasing numerical order, and the sequence repeats, starting from a smallest number, after reaching a largest number.

In an exemplary embodiment of the invention, the sequence of numbers is in decreasing numerical order, and the sequence repeats, starting from a largest number, after reaching a smallest number.

In an exemplary embodiment of the invention, the sequence of numbers alternately goes in increasing numerical order from a smallest number to a largest number, and in decreasing numerical order from the largest number to the smallest number.

In an exemplary embodiment of the invention, the sample and hold circuit comprises a capacitor, and the output voltage is substantially proportional to the charge on the capacitor. Optionally, the sample and hold circuit comprises a transistor whose gate is connected to the enabling signal, and whose base-to-collector impedance is decreased when the comparator generates the enabling signal, allowing the analog signal to charge up the capacitor to a voltage substantially dependent on the analog signal.

In an exemplary embodiment of the invention, said digital memory comprises a plurality of digital memory registers associated with each array element. Optionally, the array comprises a controller which controls which memory register the comparator reads the input number from in each array element. Optionally, the array includes a bus for writing to each register, wherein the controller is configured so that the comparator reads the input number from any one of the registers while the bus writes a next input number to another one of the registers. Optionally, the bus writes to each register using a daisy chain configuration.

In an exemplary embodiment of the invention, the controller is configured so that the comparator reads the input number from a same corresponding memory register in each array element. Optionally, the array includes a processing unit in each array element, which processing units are configured to read from and write to corresponding memory elements, and perform calculations, in each array element in parallel, responsive to instructions from the controller. Optionally, the input number read by the comparator in each array element corresponds to the brightness of a location in a digital image, and the processors are used to perform image processing calculations.

In an exemplary embodiment of the invention, the digital counter is controllable to generate a different sequence of numbers depending on the number of bits in the input number.

In an exemplary embodiment of the invention, the numbers in the sequence have more bits than the input number. Optionally, the comparator does not use all of the bits in the numbers in the sequence when comparing them to the input number.

In an exemplary embodiment of the invention, the digital counter is controllable to be reset to a given number in the sequence. Optionally, the digital counter is reset when the comparator reads a new input number from the digital memory.

In an exemplary embodiment of the invention, the digital counter generates the numbers in the sequence at regular intervals of time. Optionally, the digital counter is configured so that said intervals are adjustable.

In an exemplary embodiment of the invention, the array includes an element selector which is configured to select one of the elements of the array, and to read the voltage at one or more locations in the circuitry of said element.

In an exemplary embodiment of the invention, at least some of the pixels in said array are selectable to be operated separately form other ones of said pixels.

In an exemplary embodiment of the invention, said array is fabricated as an integrated circuit.

In an exemplary embodiment of the invention, said array is integrated with an optical computer for which said array comprises a matrix for vector matrix multiplication.

In an exemplary embodiment of the invention, said digital memory register is selectably partitionable into multiple registers. Optionally, said register is partitionable into at least two registers. Alternatively or additionally, said register is partitionable into at least three registers.

BRIEF DESCRIPTION OF THE DRAWINGS

An exemplary embodiment of the invention is described in the following section with respect to the drawings. The same reference numbers are used to designate the same or related features on different drawings. The drawings are generally not drawn to scale.

DETAILED DESCRIPTION OF EXEMPLARY EMBODIMENT

Figure 1:
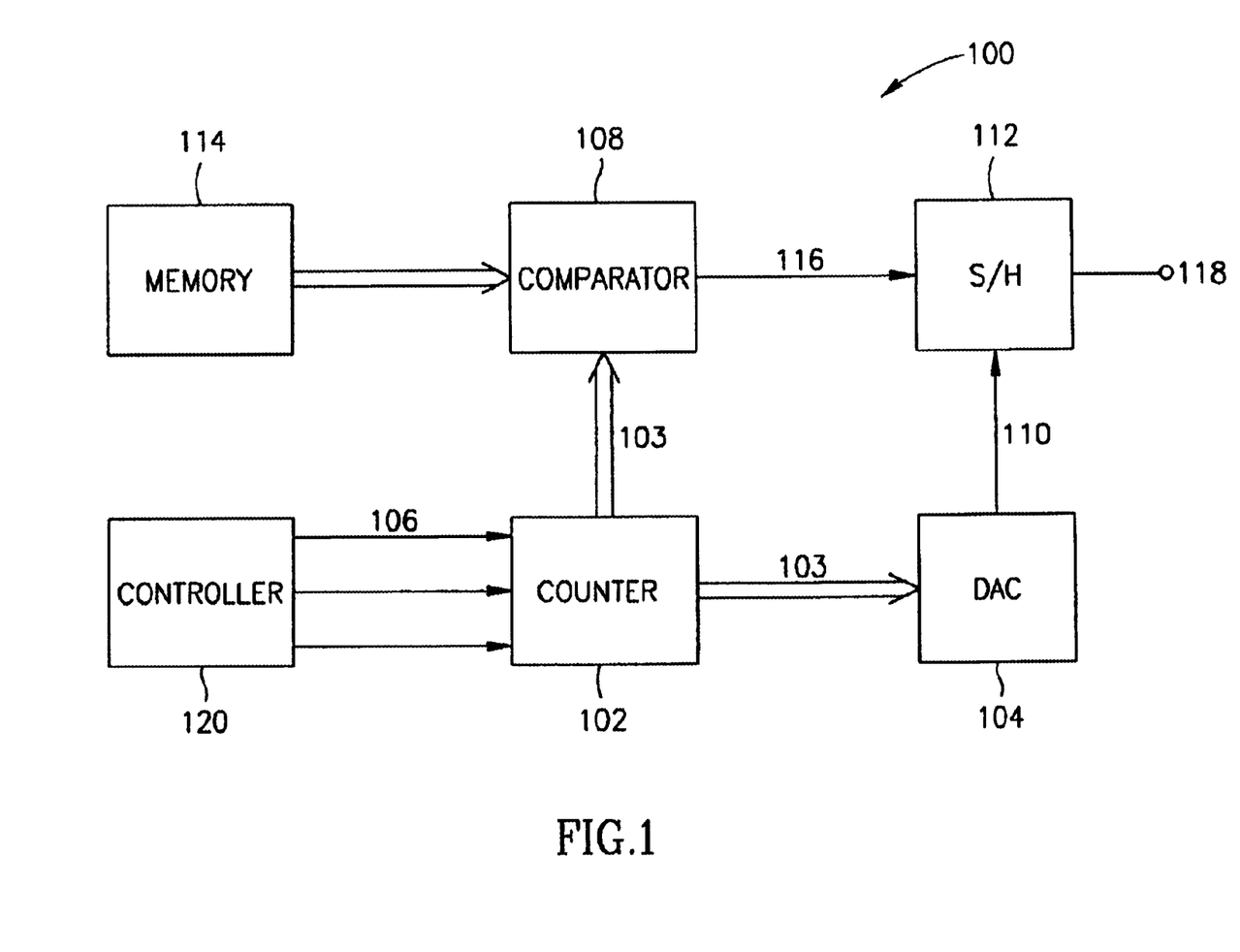
FIG. 1 is a block diagram showing the components of a circuit for parallel digital to analog conversion of an array, according to an exemplary embodiment of the invention.

FIG. 1 is a block diagram of the components of a circuit 100 used for digital to analog conversion of an array in parallel. Components that are present for each element of the array are shown in the top row of FIG. 1, while components that are used in common for all elements of the array are shown in the bottom row of FIG. 1. The components used in common include a digital counter 102 and a central digital to analog converter 104. Digital counter 102 generates as output a sequence 103 of 8-bit numbers, starting at 0 and increasing by 1 at each step to 255, and then decreasing again by 1 at a time from 255 to 0. Optionally, counter 102 always generates an increasing sequence of 8-bit numbers, and starts again at 0 after 255, instead of first ramping up and then ramping down. Possibly, alternately ramping up and down avoids sudden changes in voltage in an analog ramp signal 110 to be described below.

A controller 120 optionally sends control signals 106 to counter 102. For example, if the digital memory of each array element is 6-bit instead of 8-bit, then the controller can instruct counter 102 to count by 4 at each step instead of by 1, or the controller can instruct the counter to count by 1 from 0 to 63 and then go back down again, instead of counting front 0 to 255. The controller also sends a clock signal to counter 102, and optionally sends counter 102 a signal for setting the frequency of the counter, which can be the clock frequency divided by any integer. For example, if the counter frequency is one tenth of the clock frequency, then counter 102 generates a new 8-bit number every 10 cycles of the clock. The controller also optionally sends counter 102 a signal telling it whether to count up or down. Alternatively, the counter has internal circuitry which causes it to change the direction of counting when it reaches 255 or 0. The controller also optionally sends counter 102 a reset signal, which causes it to start at 0 (or any other given number). This is optionally done, for example, when a new set of numbers is written to the digital memory in the array elements.

Sequence 103 of 8-bit numbers is sent to a digital comparator 108 in each element of the array, and to central DAC 104. The numbers in sequence 103 need not be 8-bit. If the digital memory in each array element holds numbers with more than 8 bits or fewer than 8 bits, then the numbers in sequence 103 optionally have the same number of bits. The numbers in sequence 103 may have also more bits than the numbers in the digital memory, but preferably should not have fewer bits than the numbers in the digital memory if the digital to analog conversion is to work over the fill range of possible numbers in the digital memory. Central DAC 104 generates an analog ramp signal 110, using the digital sequence 103 as input. Ramp signal 110 is a triangle wave, if counter 102 alternately counts up and down, or a sawtooth wave if counter 102 starts at 0 after reaching 255. Ramp signal 110 is distributed to a sample and hold circuit 112 in each array element.

Optionally, instead of using central DAC 104 to generate analog ramp signal 110, analog ramp signal 110 is generated directly by analog means, for example by charging up a capacitor with a long enough RC time constant. In some embodiments of the invention, generating the analog ramp signal in this way may include resetting the analog ramp signal to zero, or to any value that is very different from its value just before resetting, may therefore require a voltage spike, or induce a time lag before the analog ramp signal is brought to the desired value. Optionally, if analog ramp signal 110 is generated by analog means, digital sequence 103 is generated by a central analog to digital converter using ramp signal 110 as input, and there is no need for digital counter 102. Alternatively, digital signal sequence 103 is generated by counter 102, and ramp signal 110 is generated independently by analog means. Optionally, a synchronizer is provided to synchronize between sequence 103 and ramp signal 110.

For each element of the array, a number stored in a digital memory 114 is sent to digital comparator 108, which compares it to each number in sequence 103 sent to the comparator. When the two numbers are equal, comparator 108 sends an enabling signal 116 to sample and hold circuit 112 for that element of the array. Alternatively, enabling signal 116 is sent to sample and hold circuit 112 until the number in sequence 103 is greater than the number stored in memory, if sequence 103 is increasing, or until the number in sequence 103 is less than the number stored in memory, if sequence 103 is decreasing. On receiving enabling signal 116, sample and hold circuit 112 samples the value of analog ramp signal 110, and sets an analog output voltage 118, for that element of the array to the same value as analog ramp signal 110, and holds analog output voltage 118 at the same value until the next time sample and hold circuit receives enabling signal 116. As will be described in FIGS. 2 and 3, sample and hold circuit 112 is optionally a simple analog circuit, and sample and hold circuit 112, together with comparator 108, is potentially much simpler and less expensive than a complete digital to analog converter would be. Thus the circuit shown in FIG. 1 is potentially simpler and less expensive than having a complete digital to analog converter for each element of the array, which is a prior art method of performing digital to analog conversion of a large array in parallel.

Optionally, output voltage 118 is used to control the fraction of light transmitted through a pixel. For example, the pixel could be made of a controllable polarizing rotating material, such as an electro-optic material, controlled by the output voltage, with a polarizing filter on the front of the pixel, and source of polarized light behind the pixel. Alternatively, output voltage 118 controls the fraction of light reflected from a pixel. Alternatively, the pixel emits light with an intensity controlled by the output voltage, as in a plasma display panel. Optionally, the light transmitted, reflected or emitted by the pixels serves as optical analog input for a massively parallel optical computer. Alternatively, output voltage 118 does not control light intensity, but is used for another application, for example as input to an analog electronic computer, or to drive an array of ultrasound transducers. An example of an optical computing system and signal processing algorithms which may use this array may be found in PCT applications filed on Sep. 3, 2002 in the IL receiving office and having attorney docket numbers 141/02683 and 141/02889 titled "Vector Matrix Multiplication" and "Multi-User Detection" respectively, the disclosures of which are incorporated herein by reference.

Figure 2:
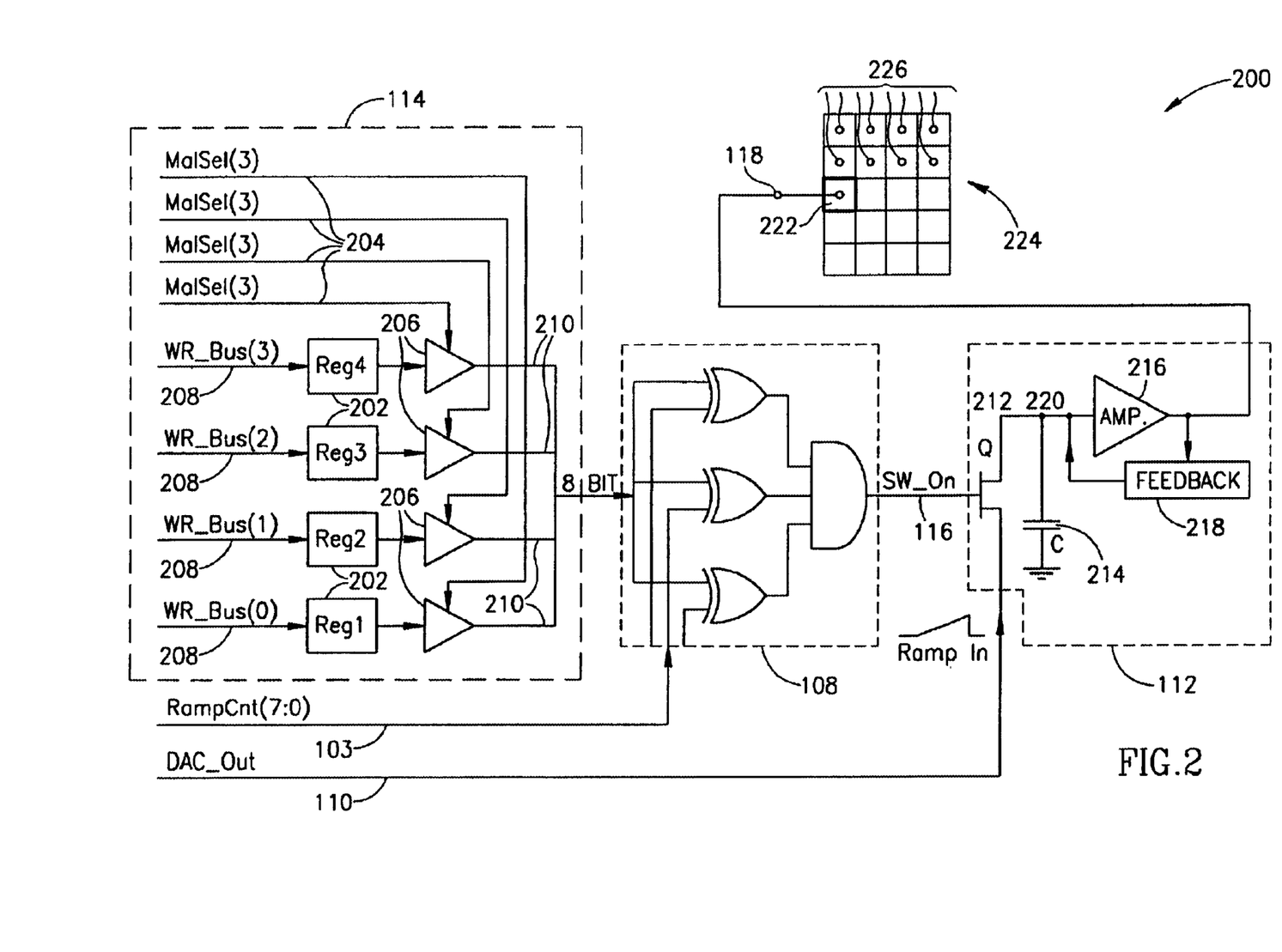
FIG. 2 is a circuit diagram showing some details of those parts of the circuit which are associated with each element of the array, according to the embodiment of the invention shown in FIG. 1.

FIG. 2 shows some details of digital memory 114, comparator 108, and sample and hold circuit 112, which are repeated for each element 200 of the array. Optionally, digital memory 114 comprises four 8-bit registers 202. Optionally, selection signals 204 from the controller select one of the registers for reading, by enabling a tri-state buffer 206 associated with that register. Selection signal 204 may used any method of signaling the tri-state buffer 206, for example using a method that reduces the number of lines. e.g. two signaling lines could be used to select one of four registers. Selection signal 204 may include instructions for selection of fewer then the maximum number of bits. While one of the registers is being read, new values can be written to the other three registers, by means of buses 208. Alternatively, the number of registers is less than four, or greater than four, and any register that is not being read can be written to. Alternatively, registers 202 have more than 8 bits each, or fewer than 8 bits each. In this case, optionally, the numbers in digital sequence 103 have the same numbers of bits as registers 202, or the numbers in digital sequence 103 have more bits than registers 202. For example, in the case, described above, where registers 202 are 6-bit, digital counter 102 in FIG. 1 counts up and down by 4 at a time instead of by 1 at a time, or only counts from 0 to 63 instead of from 0 to 255. Digital counter 102 in FIG. 1 could count from 0 to 255 by ones, even if registers 202 are 6-bit, but this would be an inefficient use of time. The output signal 210 from the register 202 that is being read is sent to digital comparator 108. In an exemplary embodiment of the invention, flexible allocation of bits stored in a register allow trade off between the number of bits, hence the DAC resolution and the number of different values which could be stored in a dynamically allocated register. For example, a 16-bits register may be configured to store two 8-bits, gray level values, three 5 bit values or 16 binary matrix elements or any combination that totals 16 bits or less.

Comparator 108 compares the 8-bit number read from one of the registers 202 with each 8-bit number in digital sequence 103. If registers 202 have fewer bits than the numbers in digital sequence 103, then comparator 108 optionally only compares some of the bits in digital sequence 103 with the number read from registers 202, or comparator 108 pads the number being read from registers 202 with extra bits, for example extra zeroes on the right or on the left. When the two numbers are equal, comparator 108 generates an enabling signal 116 to sample and hold circuit 112. Sample and hold circuit 112 also receives as input analog ramp signal 110, from central DAC 104 in FIG. 1. Sample and hold circuit 112 optionally comprises a transistor 212 and a capacitor 214. When enabling signal 116 raises the voltage of the gate of transistor 212, a current substantially proportional to ramp signal 110 flows from the base to the collector of transistor 212, and charges up capacitor 214. Enabling signal 116 remains on for one cycle of digital counter 102 in FIG. 1, which optionally is at least several times longer than the RC time of sample and hold circuit 112. Thus, the charge (and voltage) on capacitor 214 reaches a value that is proportional to ramp signal 110, during the time that enabling signal 116 is on. An amplifier 216 with a feedback loop 218 optionally maintains the voltage 220 on capacitor 214 at nearly the same value, after enabling signal 116 is turned off, until the next time enabling signal 116 is turned on. Alternatively, even without amplifier 216 and feedback loop 218, the resistance through the transistor is high enough, when enabling signal 116 is off, and the resistance of other paths from the capacitor to ground is high enough, so that the RC time of the circuit is much longer than 512 cycle times of counter 102 in FIG. 1, and the charge on the capacitor does not leak off significantly during the time that counter 102 ramps up and down. In an exemplary alternative embodiment of the invention, circuit 112 may be a track and hold device and the comparator signal is enabled as long as ramp 103 is less or equal to the stored value. On onset of updating, as digital ramp and analog ramp reset to zero, track and hold 112 tracks the analog ramp 110 until the value 103 exceeds the value stored in register 202 and the signal 116 is disabled. The output voltage 118 is optionally held until the next update cycle.

Amplifier 216 has an output voltage 118 which is the analog output for this element of the array. The amplification factor of amplifier 216 with Feedback loop 218 optionally is adjusted so that output signal 118 has the same voltage as ramp signal 110 had at the time it was sampled by sample and hold circuit 112. Alternatively, a different amplification factor is used, and the range of output signal 118 is different than the range of ramp signal 110, and output signal 118 is only proportional, or substantially proportional, to ramp signal 110 at the time it was sampled. Optionally, if there is no amplifier 216 and feedback loop 218, then output signal 118 is just the voltage 220 on capacitor 214.

Output signal 118 controls the light transmitted, reflected, or emitted (or otherwise modulated, for example having its polarization changed) by pixel 222 in display panel 224. Other pixels in display panel 224 are controlled by output signals 226 coming from other array elements, not shown in FIG. 2, similar to array element 200. Optionally, there is electronics, not shown in FIG. 2, between output 118 of array element 200, and pixel 222, in order to amplify the signal, or condition it in some other way.

Figure 3:
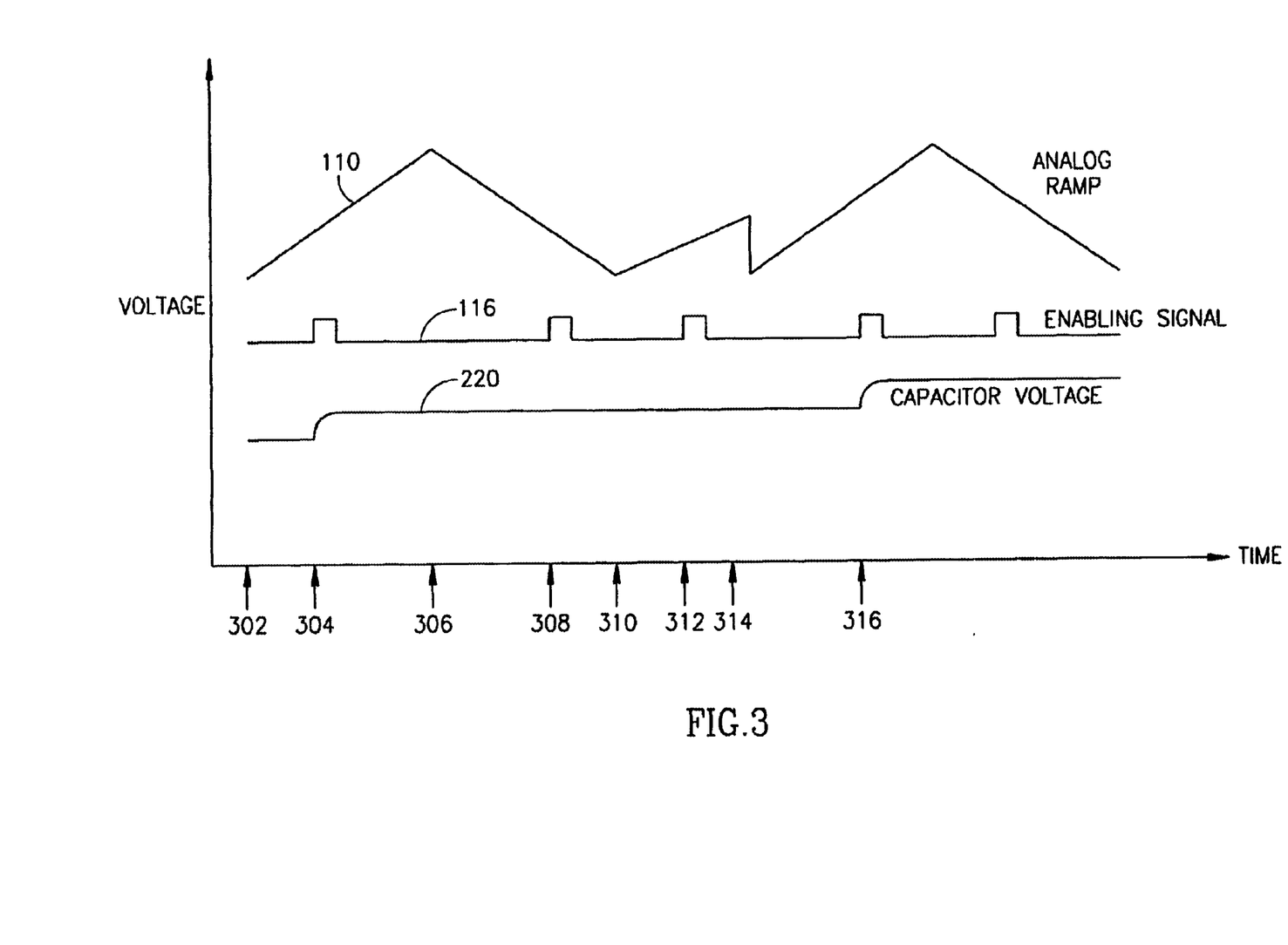
FIG. 3 is a plot of voltage vs. time for various locations in the circuit, according to the embodiment of the invention shown in FIGS. 1 and 2.

FIG. 3 shows time plots of the voltage at three points in the circuit shown in FIG. 2, the analog ramp signal 110, the enabling signal 116, and the voltage 220 on capacitor 114. These plots are only schematic, since, for clarity, the time during which the enabling signal is turned on is shown in FIG. 3 as being much longer than 1/256 of the time for the ramp signal to go from its minimum to its maximum value. In reality the enabling signal is only turned on for 1/256 of the ramp time, or 1/64 of the ramp time in the case where the digital memory is 6-bit. The plot shown in FIG. 3 begins at a time 302 when the ramp signal is at its minimum value, and the number being read from the digital memory is approximately one quarter of the way from the minimum to maximum value, i.e. it is about 64 in the case of 8-bit memory registers whose value can range from 0 to 255. When the digital counter reaches this value, at time 304, then enabling signal 116 goes from zero to a positive voltage (appropriate for activating transistor 212 in FIG. 2), and remains at that voltage for one cycle of digital counter 102 in FIG. 1. This allows capacitor 214 to charge up to a voltage that is proportional to analog ramp signal 110 at this time, i.e. about one quarter of the maximum value of analog ramp signal 110. This charging of the capacitor takes place in a time relatively short compared to the time that enabling signal 116 is turned on.

At time 306, analog ramp voltage 110 reaches its maximum value, corresponding to digital counter value 255, and starts to go down. At time 308, the digital counter again reaches the value being read from the digital memory registers, and enabling signal 116 is again turned on. During the interval between time 304 and time 308, capacitor voltage 220 goes down very little, so it only goes up slightly, back to its value after charging up at time 304, when enabling signal 116 is turned on. Analog ramp voltage 110 reaches its minimum value and starts to rise again at time 310, and enabling signal 116 is turned on again at time 312, when digital counter 102 again reaches the value being read from the digital memory registers. Again, capacitor voltage 220 changes very little at this time, because the capacitor has lost very of its charge.

If display panel 224 in FIG. 2 is used as input for an optical computer, then analog ramp voltage 110 and digital counter 255 optionally remain at their maximum values or minimum values for a period of time instead of immediately reversing direction, for example for a predetermined time period, until the optical computer requests a new set of input data, and/or until the capacitor voltage 220 has decayed significantly and needs to be refreshed.

At time 314, digital counter 102 is reset back to zero, and a different memory register is selected for reading. This register has a higher value stored in it, about two-thirds of the way from the minimum to maximum value, or about 170 in the case of 8-bit memory which ranges from 0 to 255. Analog ramp signal 110 returns to zero at time 314, and starts rising again. When digital counter 102 reaches the number being read from the digital memory, at time 316, enabling signal 116 is turned on again. Analog ramp signal 110 is now higher than it was the last time (312) that enabling signal 116 was turned on, so capacitor voltage 220 increases, reaching a higher steady-state value. If the new number being read from digital memory is lower than the old number, then, when enabling signal 116 is turned on, the capacitor will discharge through the transistor, and capacitor voltage 220 reaches a steady-state value proportional to the new number.

Digital counter 102 need not be reset to zero every time a new memory register is selected for reading. Optionally, digital counter 102 continues to generate sequence 103 without any resetting to zero, and when digital counter 102 reaches a value that matches the new number being read from memory, comparator 108 sends an enabling signal to the sample and hold circuit. Alternatively, a new memory register is selected for reading only when digital counter 102 reaches zero, or only when it reaches some other given value.

Optionally, the circuitry in FIG. 2 includes a means for the controller to select one of the array elements and to measure and display enabling signal 116, capacitor voltage 220, and/or any other voltage of interest, as a function of time, for test purposes.

Figure 4:
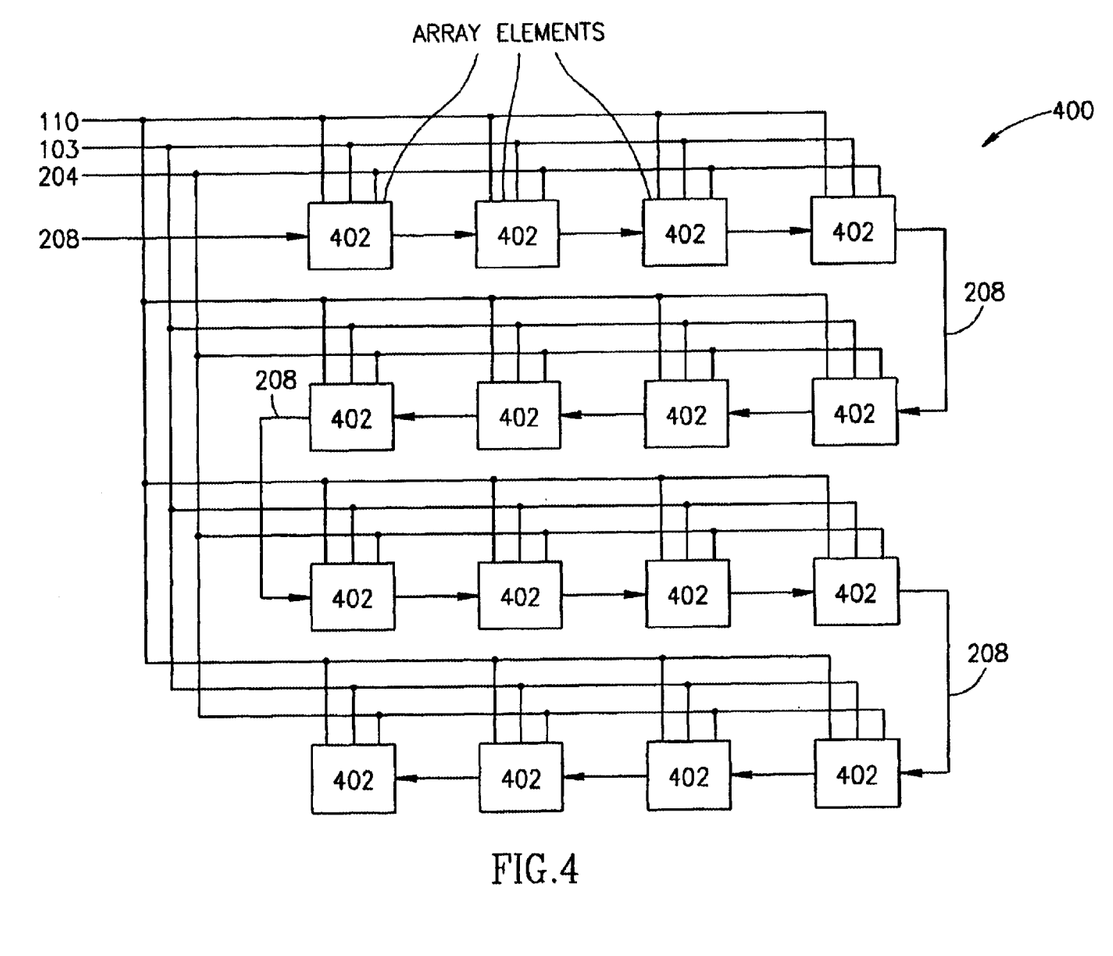
FIG. 4 is a schematic drawing showing the elements of the array and the input signals going to each element, according to the same embodiment of the invention shown in FIGS. 1 and 2.

FIG. 4 shows an array 400 of N×M elements 402, according to an exemplary embodiment of the invention. Although FIG. 4 is drawn with N=4 and M=4 for clarity, optionally N and M are much greater than 4, for example several hundred, or even several thousand or more. Optionally, each array element 402 in FIG. 4 looks like circuit 200 shown in FIG. 2, together with pixel element 222 of FIG. 2. If the array is used to provide input to an optical computer, for example, then the pixel element optionally comprises an electro-optic material, whose reflectance is controlled by output voltage 118. Other optical modulation means may be practiced instead. Optionally, the inputs to each array element 402 include a bus 208 for writing to each memory register, a selection signal 204 for enabling the digital comparator to read the contents of a particular memory register, an analog ramp signal 110, and a digital ramp signal 103. It is not necessary to have individual wires carrying each of these signals to each array element. Since the analog ramp and digital ramp are generated globally, each of these signals can be carried by a single wire which branches out to the different elements, as shown in FIG. 4. The same is true of selection signal 204, if the digital comparator in each array element is to read the corresponding memory register in all array elements in a given ramp cycle.

Bus 208 is optionally arranged as a daisy chain, as shown in FIG. 4, with the corresponding memory registers in the different array elements arranged in series along it. Optionally there is a separate bus 208 for each memory register in a given array element, as shown in FIG. 2, and each bus forms its own daisy chain. In FIG. 4, for clarity, only a single bus 208 is shown, arranged as a single daisy chain. If the bus is in the form of a daisy chain, then memory registers are written to sequentially, starting with the array element at the end of the daisy chain. Alternatively, any other method known in the art can be used to fill up the memory registers in the array elements. It is possible to have fewer buses than there are memory registers in each array element, and to have two or more memory registers in each array element arranged in series on the same bus. However, for a given bandwidth of the bus, the memory registers can be filled more quickly if each register in a given array element is on a separate bus. Such an arrangement also provides more flexibility in reading from one memory register while writing to another memory register.

Optionally, array elements 402 include additional circuitry not shown in FIG. 2. For example, each array element optionally includes a processing unit which can do calculations using the contents of the memory registers in that array element and which can write to one or more of the memory registers. Optionally, these processing units are controlled centrally and do the same calculations in parallel in all array elements. The calculations are optionally used for electronic pre-processing of the input data for an optical computer, including image processing if the input consists of images. For example, two different images of the same scene are loaded respectively into the first and second memory registers of each array element, and the processing units average the contents of the first and second registers and write the result the third register in each array element, to produce an image with less noise. Additionally images are optionally averaged together to further reduce the noise. As another example, the processing units calculate the difference between two images of the same scene at different times, to detect motion or other changes. As still another example, parts of one image are substituted for pixels of another image, when the latter pixels fall within a certain range of color (e.g., or brightness), similar to the way backgrounds showing weather maps are added to weather reports filmed in a TV studio. Other applications of the processing units for image processing, or for other uses, will be apparent to persons skilled in the art.

Figure 5:
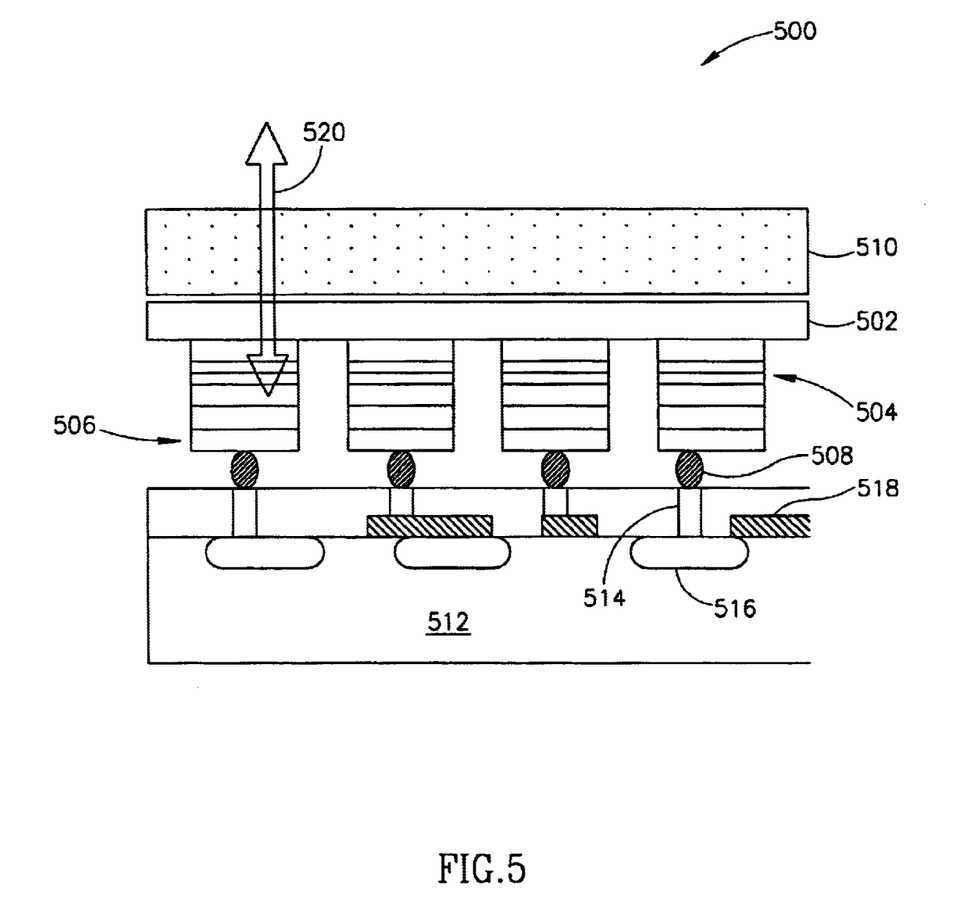
FIG. 5 is a schematic side cross-sectional view of a MQW array, in accordance with an exemplary embodiment of the invention.

FIG. 5 is a schematic side cross-sectional view of a MQW array 500, in accordance with an exemplary embodiment of the invention. It should be appreciated that as manufacturing methods change, some details of the structure may change, without leaving the scope of the invention. On a substrate of GaAs wafer 502, a series of quantum wells 504 are grown by alternating layers of GaAs and GaAlAs. Doping the structure may be used to create a PN junction in which the MQW reside. On top of the MQW structure, a Bragg reflecting mirror 506 is grown, for example by alternating layers of GaAs and GaAlAs. In an exemplary embodiment of the invention, the structure is sectioned into pixels and contacts 508 are deposited on top of each (on the mirror), for example using lithographic processes. Optionally, substrate 502 is thinned to reduce parasitic absorption and is optionally glued to a transparent plate 510 to provide mechanical strength and/or environmental stability. The structure is then flipped over and bonded to a DAC array Silicon IC 512, for example using a Flip Chip Bonding technique so that each MQW modulator pixel is electrically connected to a corresponding DAC output voltage, for example at a pad 514 attached to a circuit 516 or an interconnect 518. In use, light 520 enters the structure from the substrate side and reflected back from the Bragg mirrors. Excitons in the MQW structure may absorb the light. The absorption is optionally controlled by the voltage applied to the pixel as it tunes the wavelength of excitons' peak absorption.

Optionally, the pixels are used to supply input for an optical computer which is used for vector matrix multiplication for multi-user detection in telecommunications. This application is described, for example, in applications noted above.

The terms "substantially equivalent" when used herein of two analog signals, or two digital signals, or an analog and a digital signal, means one of the signals continues to have nearly the same value as the other signal, as the values of the two signals change in time, using an appropriate set of units for the analog signal, or for each analog signal if used in reference to two analog signals. The units used need not be the same for both analog signals, in the case of two analog signals. The terms "comprise", "include" and their conjugates as used herein mean "include but are not necessarily limited to". While the invention has been described with reference to certain exemplary embodiments, various modifications will be readily apparent to and may be readily accomplished by persons skilled in the art without departing from the spirit and scope of the above teachings.

What is claimed is:

1. A digital to analog converter array comprising:
   a plurality of pixels arranged in an array and independently addressable to selectively modulate light;
   a digital counter which generates a sequence of numbers in digital form;
   an analog signal source which generates an analog signal that corresponds to the sequence generated by the digital counter; and
   a plurality of array elements which control the pixels, each element comprising:
      a digital memory register holding at least one input number,
      a comparator which generates an enabling signal responsive to a comparison between the number in the sequence and the input number; and
      a sample and hold circuit which samples the value of the analog signal, responsive to said enabling signal, and sets an output voltage controlling a pixel to said value,
   wherein the array is configured so that the comparators in all the array elements compare the number in the sequence to the input numbers held in said array elements substantially simultaneously.

2. A digital to analog converter array according to claim 1, wherein, for at least one array element, the output voltage controls the amount of light transmitted through the pixel controlled by said array element.

3. A digital to analog converter array according to claim 2, wherein the pixel comprises a polarization rotating material controlled by the output voltage, and a polarizing filter.

4. A digital to analog converter array according to claim 2, wherein the pixel comprises a Multi Quantum Well structure, the reflectance of which is controlled by the output voltage.

5. A digital to analog converter array according to claim 1, wherein, for at least one array element, the output voltage controls the amount of light reflected by the pixel controlled by said array element.

6. A digital to analog converter array according to claim 1, wherein for at least one array element, the output voltage controls the amount of light emitted by the pixel controlled by said array element.

7. A digital to analog converter array according to claim 1, wherein said analog signal source comprises a digital to analog converter which generates the analog signal by converting the sequence of numbers to said analog signal.

8. A digital to analog converter array according to claim 1, wherein said analog signal source comprises an analog circuit, which generates said analog signal.

9. A digital to analog converter array according to claim 8, wherein the digital counter comprises an analog to digital converter which generates the sequence of numbers by converting the analog signal to said sequence of numbers.

10. A digital to analog converter array according to claim 1, wherein the sequence of numbers is in increasing numerical order, and the sequence repeats, starting from a smallest number, after reaching a largest number.

11. A digital to analog converter array according to claim 1, wherein the sequence of numbers is in decreasing numerical order, and the sequence repeats, starting from a largest number, after reaching a smallest number.

12. A digital to analog converter array according to claim 1, wherein the sequence of numbers alternately goes in increasing numerical order from a smallest number to a largest number, and in decreasing numerical order from the largest number to the smallest number.

13. A digital to analog converter array according to claim 1, wherein the sample and hold circuit comprises a capacitor, and the output voltage is substantially proportional to the charge on the capacitor.

14. A digital to analog converter array according to claim 13, wherein the sample and hold circuit comprises a transistor whose gate is connected to the enabling signal, and whose base-to-collector impedance is decreased when the comparator generates the enabling signal, allowing the analog signal to charge up the capacitor to a voltage substantially dependent on the analog signal.

15. A digital to analog converter array according to claim 1, wherein said digital memory comprises a plurality of digital memory registers associated with each array element.

16. A digital to analog converter array according to claim 15, comprising a controller which controls which memory register the comparator reads the input number from in each array element.

17. A digital to analog converter array according to claim 16, and including a bus for writing to each register, wherein the controller is configured so that the comparator reads the input number from any one of the registers while the bus writes a next input number to another one of the registers.

18. A digital to analog converter array according to claim 17, wherein the bus writes to each register using a daisy chain configuration.

19. A digital to analog converter array according to claim 16, wherein the controller is configured so that the comparator reads the input number from a same corresponding memory register in each array element.

20. A digital to analog converter array according to claim 19, and including a processing unit in each array element, which processing units are configured to read from and write to corresponding memory elements, and perform calculations, in each array element in parallel, responsive to instructions from the controller.

21. A digital to analog converter array according to claim 20, wherein the input number read by the comparator in each array element corresponds to the brightness of a location in a digital image, and the processors are used to perform image processing calculations.

22. A digital to analog converter array according to claim 15, wherein said digital memory register is selectably partitionable into multiple registers.

23. A digital to analog converter array according to claim 22, wherein said register is partitionable into at least two registers.

24. A digital to analog converter array according to claim 22, wherein said register is partitionable into at least three registers.

25. A digital to analog converter array according to claim 1, wherein the digital counter is controllable to generate a different sequence of numbers depending on the number of bits in the input number.

26. A digital to analog converter array according to claim 1, wherein the numbers in the sequence have more bits than the input number.

27. A digital to analog converter array according to claim 26, wherein the comparator does not use all of the bits in the numbers in the sequence when comparing them to the input number.

28. A digital to analog converter array according claim 1, wherein the digital counter is controllable to be reset to a given number in the sequence.

29. A digital to analog converter array according to claim 28, wherein the digital counter is reset when the comparator reads a new input number from the digital memory.

30. A digital to analog converter array according to claim 1, wherein the digital counter generates the numbers in the sequence at regular intervals of time.

31. A digital to analog converter array according to claim 30, wherein the digital counter is configured so that said intervals are adjustable.

32. A digital to analog converter array according to claim 1, and including an element selector which is configured to select one of the elements of the array, and to read the voltage at one or more locations in the circuitry of said element.

33. A digital to analog converter array according to claim 1, wherein at least some of the pixels in said array are selectable to be operated separately form other ones of said pixels.

34. A digital to analog converter array according to claim 1, wherein said array is fabricated as an integrated circuit.

35. A digital to analog converter array according to claim 1, wherein said array is integrated with an optical computer for which said array comprises a matrix for vector matrix multiplication.

* * * * *

UNITED STATES PATENT AND TRADEMARK OFFICE
CERTIFICATE OF CORRECTION

PATENT NO.   : 6,724,334 B2  
DATED        : April 20, 2004  
INVENTOR(S)  : Tzvi Tzelnick et al.

Page 1 of 1

It is certified that error appears in the above-identified patent and that said Letters Patent is hereby corrected as shown below:

<u>Title page,</u>  
Item [75], Inventors, after "Tzvi Tzelnick, Tel-Aviv (IL)" add -- Yaron Blecher, Ness Ziona (IL); Rachel Cohen, Raanana (IL); Dan Eshet, Ramat-Gan (IL); Arie Mor, Givatayim (IL) --

Signed and Sealed this

Seventeenth Day of August, 2004

JON W. DUDAS  
*Acting Director of the United States Patent and Trademark Office*